United States Patent
Yane

(10) Patent No.: US 8,361,831 B2
(45) Date of Patent: Jan. 29, 2013

(54) ZINC OXIDE FILM FORMING METHOD AND APPARATUS

(75) Inventor: Takeshi Yane, Kyoto (JP)

(73) Assignee: Dainippon Screen Mfg. Co., Ltd. (JP)

( * ) Notice: Subject to any disclaimer, the term of this patent is extended or adjusted under 35 U.S.C. 154(b) by 492 days.

(21) Appl. No.: 12/636,358

(22) Filed: Dec. 11, 2009

(65) Prior Publication Data

US 2010/0167460 A1  Jul. 1, 2010

(30) Foreign Application Priority Data

Dec. 25, 2008  (JP) ................... 2008-329755

(51) Int. Cl.
 *H01L 27/142* (2006.01)
 *H01L 21/288* (2006.01)
(52) U.S. Cl. ............ 438/85; 438/608; 257/E27.125; 136/265; 427/74
(58) Field of Classification Search ............ 438/85, 438/608; 257/E27.125; 136/265; 427/74
See application file for complete search history.

(56) References Cited

U.S. PATENT DOCUMENTS

| 6,860,982 B2 * | 3/2005 | Okura et al. ............... 205/333 |
| 2006/0054191 A1 | 3/2006 | Higuchi et al. |
| 2006/0162765 A1 | 7/2006 | Minoura et al. |

FOREIGN PATENT DOCUMENTS

| JP | 5-66212 | 3/1993 |
| JP | 11-76714 | 3/1999 |
| JP | 2000-8180 | 1/2000 |
| JP | 2001-54756 | 2/2001 |
| JP | 2002-153793 | 5/2002 |
| JP | 2004-6235 | 1/2004 |
| JP | 2005-259514 | 9/2005 |
| JP | 2006-100493 | 4/2006 |
| JP | 2007-26994 | 2/2007 |
| JP | 2007-165653 | 6/2007 |
| JP | 2007-203263 | 8/2007 |
| JP | 2008-62181 | 3/2008 |

* cited by examiner

*Primary Examiner* — Zandra Smith
*Assistant Examiner* — Toniae Thomas
(74) *Attorney, Agent, or Firm* — Ostrolenk Faber LLP

(57) ABSTRACT

In the zinc oxide film forming apparatus (1), the deposit containing zinc oxide is formed on the conductive layer of the resin substrate (9) by electrodeposition in the deposition part (2), and the resin substrate (9) is carried to the applying part (4). Subsequently, the film forming material which is in liquid or paste form and contains particles of zinc oxide and solvent is applied onto the conductive layer, and then the solvent is removed from the film forming material on the conductive layer by volatilization. It is therefore possible to easily and efficiently form the porous zinc oxide film which has superior adhesion to the conductive layer of the resin substrate (9).

9 Claims, 9 Drawing Sheets

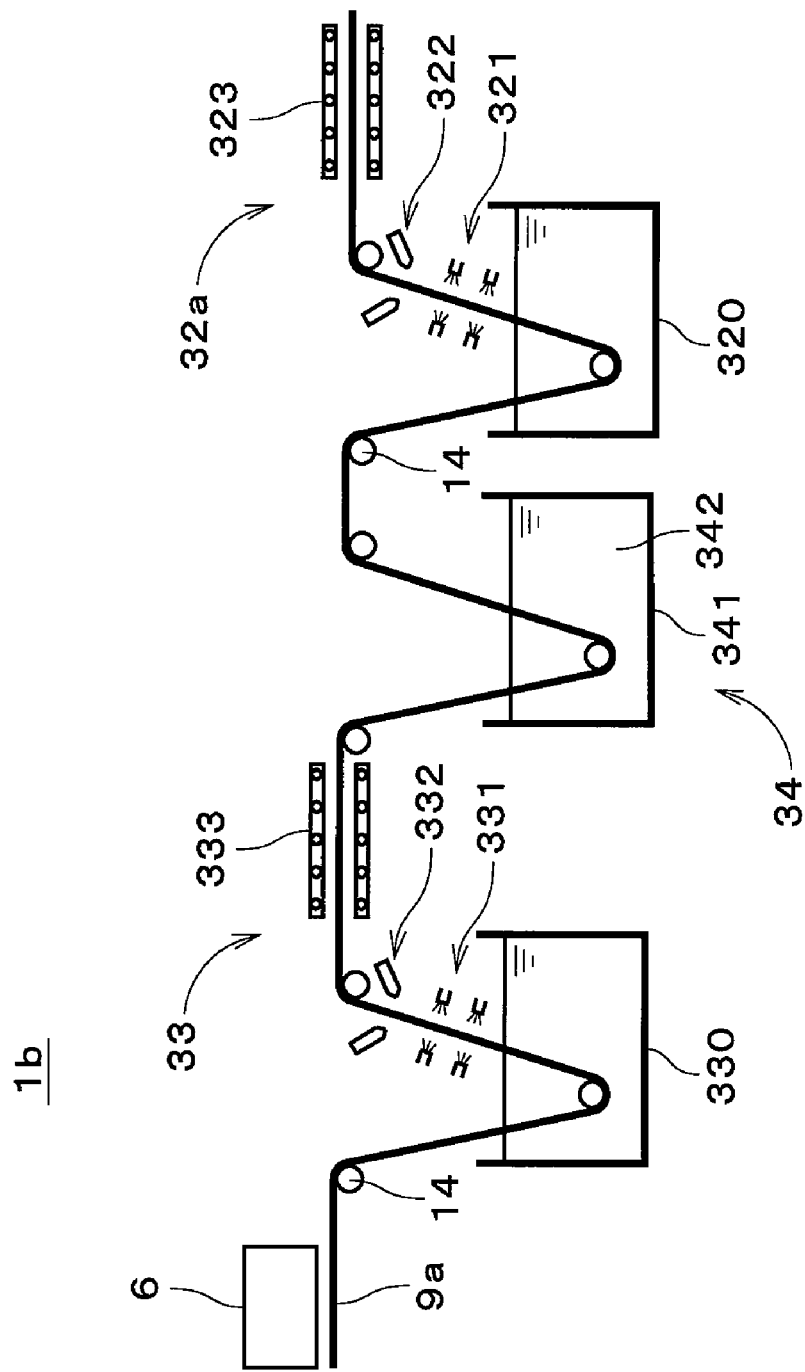

ZINC OXIDE FILM FORMING METHOD AND APPARATUS

TECHNICAL FIELD

The present invention relates to a technique of forming a porous zinc oxide film on a base member, which is a film used as a photoelectric conversion layer in a dye-sensitized solar cell.

BACKGROUND ART

Recently, a dye-sensitized solar cell have been paid attention to and it can be used as a power source of a various product without impact to its design and be manufactured with low cost. The dye-sensitized solar cell has a structure where a transparent substrate having a conductive layer (for instance, a layer of ITO (Indium Tin Oxide) film or FTO (Fluorine-doped Tin Oxide) film), a photoelectric conversion layer, a charge transport layer, and a counter substrate having a counter electrode conductive layer are build up. The technique where paste containing semiconductive particles such as titanium oxide is applied on the substrate and the paste is burned at a high temperature, is employed as a technique of forming a porous semiconductive layer which becomes the photoelectric conversion layer.

It is required that the dye-sensitized solar cell is manufactured with use of a resin substrate which is lightweight and low cost. Japanese Patent Application Laid-Open No. 2004-6235 (Document 1) proposes the technique where cathodic electrodeposition is performed on the substrate in electrodeposition liquid containing template agent to form a zinc oxide thin film containing the template agent, on the conductive layer of the substrate and then the template agent is desorbed to form a porous zinc oxide film. In the technique of the Document 1, the porous zinc oxide film can be formed on the resin substrate without the burning process which is inappropriate for the resin substrate.

However, there is a problem that productivity of the dye-sensitized solar cell in the technique of the Document 1 becomes low, because long process time is required for electrodeposition of the zinc oxide film and desorption of the template agent. So, in Japanese Patent Application Laid-Open No. 2008-62181 (Document 2), proposed is the technique where particle film of zinc oxide is formed on the conductive layer of the substrate by application of paste which contains zinc oxide particles and organic solvent, the particle film is immersed in immersion liquid which consists primarily of polar solvent to cause dissolution and redeposition of zinc oxide in the film, and therefore the zinc oxide film having high mechanical strength and high conductivity is formed. The productivity of the dye-sensitized solar cell with the resin substrate can be increased in the technique of the Document 2.

Japanese Patent Application Laid-Open No. 2005-259514 (Document 3) discloses the technique where a titanium oxide base layer is formed by application of paste of titanium oxide and this titanium oxide base layer is immersed in titanium oxysulfate solution to strengthen the bonds between titanium oxide particles and increase power generation efficiency of the dye-sensitized solar cell. In Japanese Patent Application Laid-Open No. 2000-8180 (Document 4), disclosed is the technique where catalytic process is performed on a non conductive base member with activating agent containing silver ion and thereafter it is immersed in zinc oxide deposition solution to form the zinc oxide film on the base member by the electroless method.

In the meantime, although the bonds between the zinc oxide particles are strengthened by immersing the particle film of zinc oxide into the immersion liquid in the technique of the Document 2, adhesion between the zinc oxide film and the conductive layer is not secured (actually, it is considered that the zinc oxide film adheres to the conductive layer by only mechanical engagement between a convexo-concave surface of the zinc oxide film and a convexo-concave surface of the conductive layer). As the result, there is a case where the zinc oxide film falls off from the substrate in the downstream processes of manufacturing of dye-sensitized solar cell.

SUMMARY OF INVENTION

The present invention is intended for a zinc oxide film forming method of forming a porous zinc oxide film on a base member, the zinc oxide film being used as a photoelectric conversion layer in a dye-sensitized solar cell. It is an object of the present invention to easily and efficiently form the porous zinc oxide film which has superior adhesion to the conductive layer of the base member.

The zinc oxide film forming method according to the present invention comprises the steps of: a) forming a deposit on a conductive layer formed on a base member by electrodeposition or chemical deposition, the deposit containing zinc oxide; and b) applying film forming material which is in liquid or paste form and contains particles of zinc oxide and solvent, onto the conductive layer where the deposit is formed, and removing the solvent from film forming material on the conductive layer to form a porous zinc oxide film on the conductive layer. In the present invention, it is possible to easily and efficiently form the porous zinc oxide film which has superior adhesion to the conductive layer of the base member.

According to a preferred embodiment of the present invention, the step b) comprises the step of supplying auxiliary liquid to film forming material on the conductive layer after application of film forming material, the auxiliary liquid being pure water or containing zinc ion. It is therefore possible to further strengthen the bonds between the particles of zinc oxide and the bonds between the particles and the deposit.

According to another preferred embodiment of the present invention, since the method further comprises the step of adding metal to the zinc oxide film by supplying the zinc oxide film with solution containing ion of the metal which is nobler than zinc after the step b), the zinc oxide film to which another kind of metal is added can be formed easily.

According to still another preferred embodiment of the present invention, a wiring pattern made of material whose specific resistance is lower than that of the conductive layer is formed on the conductive layer, and a mask having repellency to film forming material is formed so that the wiring pattern is covered with the mask in the base member. This suppresses that the film forming material adheres to the mask, and it is therefore possible to remove the mask easily.

In the case where the deposit is formed in the form of numerous islands in the step a), formation of the deposit can be performed in a short time period. In the case where the deposit is formed in the form of a film in the step a), adhesion between the zinc oxide film and the conductive layer can be further increased.

The present invention is also intended for a zinc oxide film forming apparatus for forming a porous zinc oxide film on a base member, the zinc oxide film being used as a photoelectric conversion layer in a dye-sensitized solar cell.

These and other objects, features, aspects and advantages of the present invention will become more apparent from the following detailed description of the present invention when taken in conjunction with the accompanying drawings.

BRIEF DESCRIPTION OF DRAWINGS

FIG. 9 is a view showing another example of the zinc oxide film forming apparatus;

DESCRIPTION OF EMBODIMENTS

Figure 1:
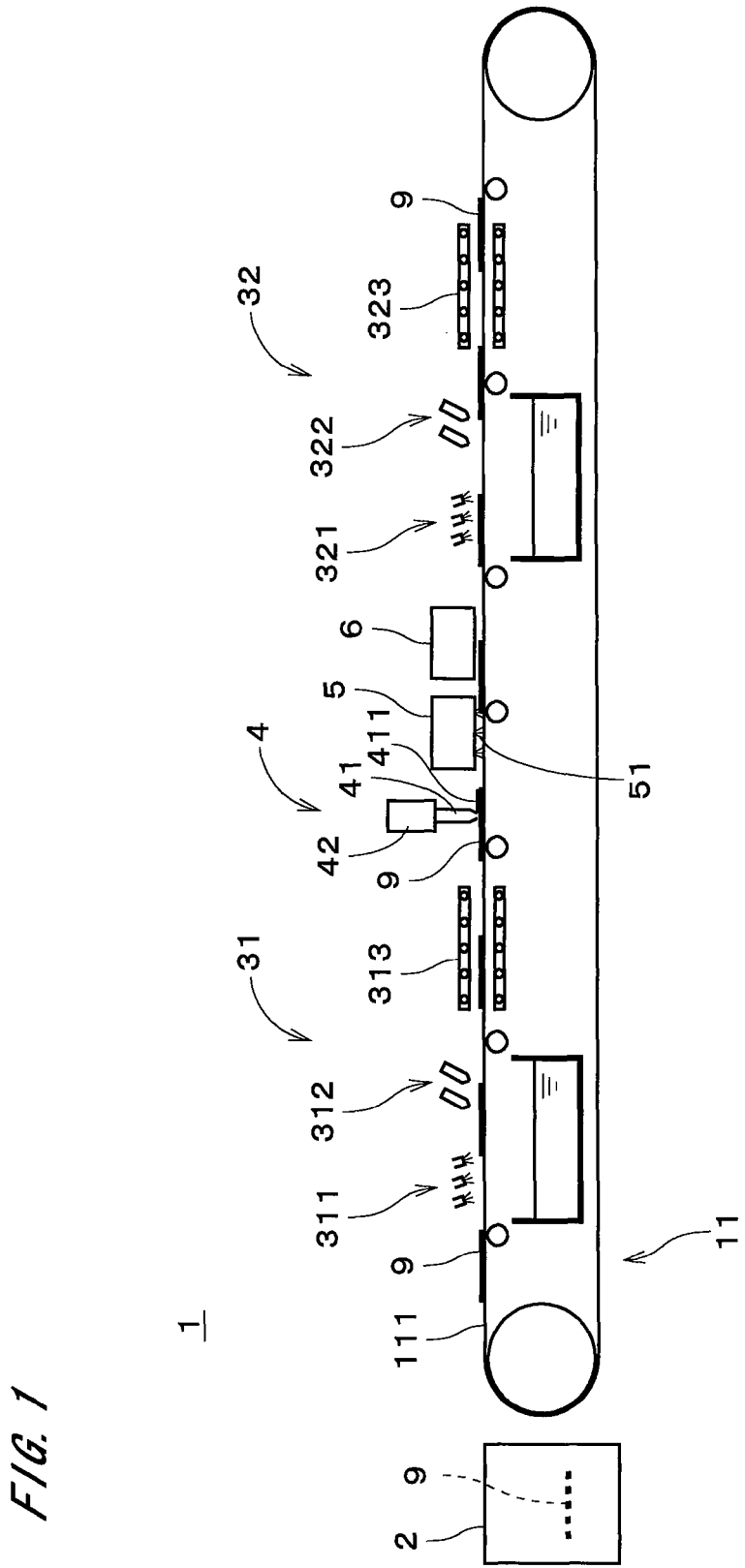
FIG. 1 is a view showing a constitution of a zinc oxide film forming apparatus in accordance with a first preferred embodiment.

FIG. 1 is a view showing a constitution of a zinc oxide film forming apparatus 1 in accordance with a first preferred embodiment of the present invention. The zinc oxide film forming apparatus 1 is used for forming a porous thin film of zinc oxide on a transparent resin substrate 9 which has a transparent conductive layer such as ITO (Indium Tin Oxide) film or FTO (Fluorine-doped Tin Oxide) film. In the downstream processes, a counter substrate having a counter electrode (a counter electrode conductive layer) is provided so that the counter substrate faces the resin substrate 9 on which the zinc oxide film is formed, liquid electrolyte is injected between two substrate to form a charge transport layer (electrolyte layer), and therefore the dye-sensitized solar cell is manufactured. As above, the zinc oxide film formed in zinc oxide film forming apparatus 1 is used as a photoelectric conversion layer (it is also called as photoelectrode layer) in the dye-sensitized solar cell.

The zinc oxide film forming apparatus 1 of FIG. 1 comprises a deposition part 2 for forming a deposit containing zinc oxide on the conductive layer formed on the resin substrate 9 by electrodeposition, a first cleaning part 31 for cleaning and drying the resin substrate 9, an applying part 4 for applying film forming material which is in liquid or paste form and contains particles of zinc oxide, onto the conductive layer where the deposit is formed, an auxiliary liquid supplying part 5 for supplying auxiliary liquid, which is almost saturated with zinc ion, to the film forming material on the conductive layer after application of the film forming material by the applying part 4, a humidifying part 6 for spouting vapor of pure water toward the conductive layer of the resin substrate 9, a second cleaning part 32 for cleaning and drying the resin substrate 9, and a carrying part 11 for horizontally moving the resin substrate 9, which is brought out from the deposition part 2, to the first cleaning part 31, the applying part 4, the auxiliary liquid supplying part 5, the humidifying part 6 and the second cleaning part 32 in sequence. Hereinafter, a moving direction of the resin substrate 9 by the carrying part 11 is referred to as a carrying direction.

Figure 2:
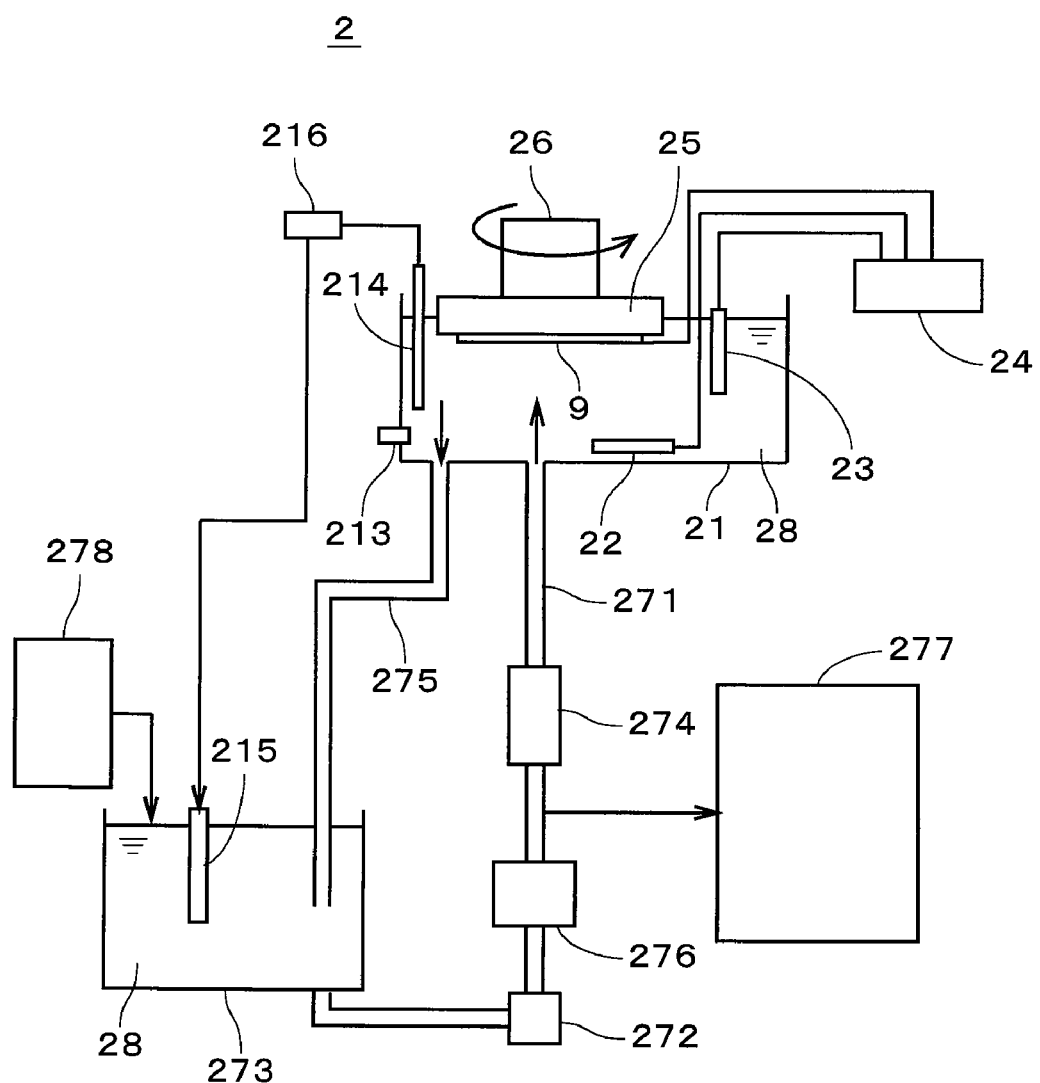
FIG. 2 is a view showing a constitution of a deposition part.

FIG. 2 is a view showing a constitution of the deposition part 2. The deposition part 2 of FIG. 2 comprises an electrodeposition bath 21 which stores electrodeposition liquid containing chloride ion, zinc ion and template agent as primary components (i.e., it contains zinc chloride ($ZnCl_2$) and template agent as primary components), a substrate holding part 25 which holds resin substrate 9 and is immersed in the electrodeposition liquid, a rotating mechanism 26 for rotating the substrate holding part 25 around the central axis which passes through the center of the resin substrate 9 held by the substrate holding part 25 and is perpendicular to main surfaces of the resin substrate 9, a counter electrode 22 and a reference electrode 23 (for example, it is a silver-silver chloride (Ag/AgCl) electrode) disposed in the electrodeposition liquid, and a power source part 24 which is electrically connected with the conductive layer of the resin substrate 9, the counter electrode 22 and the reference electrode 23. In FIG. 2 (and FIG. 8A), the electrodeposition liquid stored in the electrodeposition bath 21 (and the electrodeposition liquid tank 273 described later) is denoted by a reference sign 28. In the power source part 24, the current passing through the conductive layer of the resin substrate 9 can be detected.

A supply pipe 271 is attached to the electrodeposition bath 21 and is provided with a filter 274. The supply pipe 271 is also connected with an electrodeposition liquid tank 273 through a pump 272. The electrodeposition liquid tank 273 stores the electrodeposition liquid returned from the electrodeposition bath 21 through an exhaust pipe 275. By driving the pump 272, the electrodeposition liquid is supplied into the electrodeposition bath 21 from the electrodeposition liquid tank 273 while undesired substances and air bubbles in the electrodeposition liquid are removed in the filter 274, and a constant amount of the electrodeposition liquid is stored in the electrodeposition bath 21. As above, since the undesired substances and the air bubbles in the electrodeposition liquid are removed, degradation of quality of the deposit due to the undesired substances and occurrence of missing parts in the deposit due to the air bubbles are prevented.

In fact, the electrodeposition liquid derived from the supply pipe 271 is spouted toward a main surface (the main surface is opposed to another main surface facing the substrate holding part 25) of the resin substrate 9 disposed in the electrodeposition bath 21 (for example, it is spouted at a flow rate of 15 liter per minute (15 L/min)) and jet flow of the electrodeposition liquid collides with the main surface. In the deposition part 2 of FIG. 2, a circulation mechanism for circulating the electrodeposition liquid between the electrodeposition bath 21 and the electrodeposition liquid tank 273 is constructed by the supply pipe 271, the pump 272 and the exhaust pipe 275.

A dissolved oxygen meter 213 for measuring oxygen concentration in the electrodeposition liquid and a thermometer 214 for measuring a temperature of the electrodeposition liquid are attached to the electrodeposition bath 21. A heater 215 is provided in the electrodeposition liquid tank 273, a temperature controller 216 controls the heater 215 on the basis of output of the thermometer 214, and therefore the electrodeposition liquid circulating between the electrodeposition bath 21 and the electrodeposition liquid tank 273 remains at a constant temperature. The electrodeposition liquid tank 273 may be provided with a mechanism for agitating the electrodeposition liquid, a thermometer and so on.

A gas-dissolving unit 276 is provided between the filter 274 and the pump 272 in the supply pipe 271 and oxygen is dissolved in the electrodeposition liquid in accordance with a measurement value in the dissolved oxygen meter 213. As above, since oxygen is dissolved at the inside of the supply pipe 271 which is not exposed to the air, the dissolved oxygen concentration in the electrodeposition liquid can become saturation easily. An analyzer 277 for analyzing components of the electrodeposition liquid is connected between the filter 274 and the gas-dissolving unit 276, and needed volume of each component contained in the electrodeposition liquid (for example, the component is highly concentrated zinc chloride solution or the template agent) is supplied into the electrodeposition liquid tank 273 from a component adjusting part 278 in accordance with the result in the analyzer 277. The electrodeposition bath 21 may be provided with a mechanism for agitating the electrodeposition liquid and a heater as appropriate, and a mechanism for removing gas dissolved in the electrodeposition liquid may be provided in the supply pipe 271 to increase oxygen concentration in the electrodeposition liquid in cooperation with the gas-dissolving unit 276.

Figure 3:
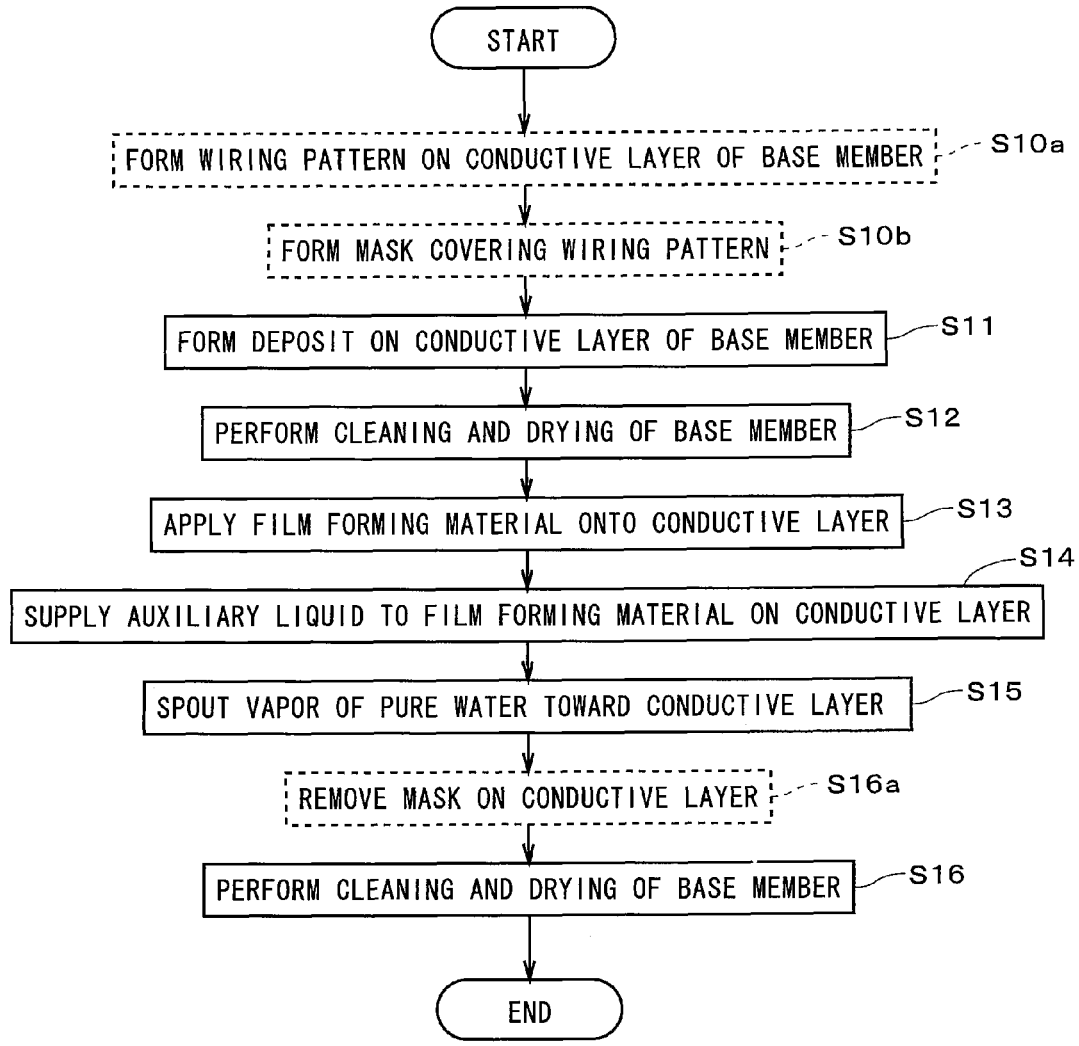
FIG. 3 is a flowchart showing an operation flow for forming a zinc oxide film on a base member.

FIG. 3 is a flowchart showing an operation flow where the zinc oxide film forming apparatus 1 forms a zinc oxide film on the resin substrate 9. Respective operations in FIG. 3 which are surrounded by rectangles of dashed lines (i.e., Steps S10a, S10b, S16a) are performed in a zinc oxide film forming apparatus 1a discussed later and they are not performed in the zinc oxide film forming apparatus 1 of FIG. 1. As described later, since there is a case where the zinc oxide film is formed on a base member other than the resin substrate 9, the resin substrate 9 is generalized to be expressed as "base member" in FIG. 3.

Although in fact a plurality of resin substrates 9 are processed in parallel in a plurality of constituent elements (the deposition part 2, the first cleaning part 31, the applying part 4, the auxiliary liquid supplying part 5, the humidifying part 6 and the second cleaning part 32) of the zinc oxide film forming apparatus 1, discussion will be made with focus on one resin substrate 9 in the following discussion.

In addition, a predetermined wiring pattern (so-called current collecting wire) made of material whose specific resistance is lower than that of the conductive layer is formed in advance on the conductive layer of the resin substrate 9 by copper plating, printing of silver paste or the like, in the present embodiment, and furthermore, a mask having repellency to the film forming material ejected from the applying part 4 (i.e., the repellency is ability to repel the film forming material) is formed by the photolithography method, the printing method or the like, so that the wiring pattern is covered with the mask.

In forming a zinc oxide film on the resin substrate 9, first, the rotating mechanism 26 is moved up by an elevating mechanism in the deposition part 2 of FIG. 2, to bring out the substrate holding part 25 from the electrodeposition liquid. Subsequently, the resin substrate 9 is disposed in the vicinity of the lower surface of the substrate holding part 25 in the state where the conductive layer faces downward, by a robot arm (not shown) which is provided between the deposition part 2 and the carrying part 11 (see FIG. 1). The resin substrate 9 is held in the substrate holding part 25 by a chucking mechanism of the substrate holding part 25. After the robot arm is evacuated, the resin substrate 9 is immersed in the electrodeposition liquid together with the substrate holding part 25 by downward movement of the rotating mechanism 26.

In the present embodiment, the electrodeposition liquid which contains for example, 5 millimole (i.e., 5 mM) of zinc chloride per liter, 0.1 mole (0.1 M) of potassium chloride per liter, and 40 micromole (40 microM) of the template agent (for example, dye) per liter is prepared and a temperature of the electrodeposition liquid is adjusted at 45° C. The substrate holding part 25 is rotated 25 times per minute (i.e., rotation speed of 25 rpm) by the rotating mechanism 26 and an electric potential of the conductive layer relative to the reference electrode 23 is controlled by the power source part 24. For example, in the case where a saturated Ag/AgCl electrode is used as the reference electrode 23, the electrical potential of the conductive layer relative to the electrode is controlled at (−1.0) volt (V). As above, a predetermined voltage (the difference of the electrical potentials) is supplied between the conductive layer of the resin substrate 9 and the reference electrode 23, and therefore the electrodeposition is performed on the resin substrate 9 to form the deposit containing zinc oxide and the template agent on the resin substrate 9 (Step S11). At this time, if the wiring pattern is not covered with the mask, the deposit is biasedly deposited on the wiring pattern whose electric resistance is lower than (for example, equal to or lower than one tenth of) that of the conductive layer. However, since the wiring pattern is covered with the insulation mask actually, deposition of the deposit material on the wiring pattern is prevented.

The supply of the voltage is continued for a predetermined time period (for example, 1 to 5 minutes). After that, the rotating mechanism 26 is moved up, the vicinity of the outer edge of the conductive layer which faces downward in the resin substrate 9 is held by a suction chuck of the robot arm and the resin substrate 9 is transferred from the substrate holding part 25 to the robot arm. In the robot arm, the resin substrate 9 is flipped so that the conductive layer faces upward, and the resin substrate 9 is placed on a belt 111 of the carrying part 11 of FIG. 1 in the state where the conductive layer faces upward. The resin substrate(s) 9 is continuously moved at a slow speed toward the right side of FIG. 1 together with a portion(s) of the belt 111. The mechanism for transferring the resin substrate 9 from the deposition part 2 to the carrying part 11 may include a mechanism for supporting the resin substrate 9 held in the substrate holding part 25 by contacting its bottom side and a mechanism for flipping the resin substrate 9 supported at its bottom side and placing it on the belt 111.

Figure 4:
FIG. 4 is a view showing resin substrates on a belt of a carrying part.

FIG. 4 is a view showing resin substrates 9 on the belt 111 of the carrying part 11. As shown in FIG. 4, a plurality of stoppers are formed on the belt 111 so as to be arranged in the carrying direction. In particular, when two stoppers 112 which are disposed so as to sandwich one resin substrate 9 with respect to the carrying direction, are referred to as a stopper pair, a plurality of stopper pairs are formed on the belt 111 with leaving certain spaces (at a constant pitch) and each stopper pair prevent the resin substrate 9 on the way of carriage from being displaced (deviated). Since the belt 111 has water resistance and chemical resistance, degradation of the belt 111 due to after-mentioned processes for the resin substrates 9 by the first cleaning part 31, the applying part 4, the auxiliary liquid supplying part 5, the humidifying part 6 and the second cleaning part 32, is prevented.

When the resin substrate 9 comes to the first cleaning part 31 shown in FIG. 1 (to be exact, each portion of the resin substrate 9 comes under a cleaning spray group 311), cleaning liquid such as pure water is gently spouted from the cleaning spray group 311 toward the surface of the resin substrate 9 on the belt 111, to remove undesired substances (potassium chloride and so on) contained in the electrodeposition liquid. Subsequently, the cleaning liquid on the surface of the resin substrate 9 is removed by air blown from air knives 312. At this time, since a certain amount of the template agent in the deposit is removed, the deposit on the conductive layer becomes porous (for example, a collective of crystals in the form of rods each of which has a diameter of 1 to 500 nanometer (nm)). Since a blowing direction of air in the air knives 312 is inclined from the vertical direction to the backward in a traveling direction of the resin substrate 9, residue of the cleaning liquid on the surface of the resin substrate 9 is prevented.

After that, the resin substrate 9 passes through a dry kiln 313 and therefore drying of the resin substrate 9 is performed (Step S12). In the zinc oxide film forming apparatus 1, by drying the surface of the resin substrate 9 securely (i.e., by preventing residue of the cleaning liquid on the conductive layer), it is possible for the film forming material to uniformly adhere to the whole surface (except the surface of the mask) of the resin substrate 9 in an after-mentioned process by the applying part 4. In the first cleaning part 31, there may be a case where a width of the space between the cleaning spray group 311 and the surface of the resin substrate 9 is made to be smaller and cleaning of the resin substrate 9 is performed with the space filled with the cleaning liquid.

Subsequently, when the resin substrate 9 comes under the applying part 4, the film forming material (i.e., the film forming material containing particles of zinc oxide) supplied from the material tank 42 having a agitating mechanism (or a mechanism for dispersing the particles) is ejected from a slit nozzle 41, to apply the film forming material onto the conductive layer where the deposit is formed (Step S13). In FIG. 1, the film forming material applied on the resin substrate 9 is denoted by a reference sign 411. At this time, by the slit nozzle 41 which has an elongated outlet in a horizontal direction perpendicular to the carrying direction, the film forming material is accurately applied at a predetermined thickness which is thinner than a thickness of the mask. And also, since the mask formed on the conductive layer has repellency to the film forming material, the film forming material adheres to areas on the conductive layer other than the mask. Highly volatile organic solvent containing water, alcohol and the rest, is used for the film forming material. Thus, before each portion of the resin substrate 9 which is moved in the carrying direction at low speed reaches a processing position of the subsequent (downstream in the carrying direction) auxiliary liquid supplying part 5, a certain amount of the solvent in the film forming material on the conductive layer is removed by volatilization, so that a porous zinc oxide film is formed on the conductive layer.

In the case where the film forming material is applied at a thickness of 100 micrometer in the applying part 4, the thickness of the film forming material after removal of the solvent (i.e., the film forming material which is the zinc oxide film) becomes for example 10 to 15 micrometer. Preferably, the particle size distribution (i.e., particle diameter distribution) of the particles of zinc oxide contained in the film forming material covers a range of 5 to 500 nanometer. As above, since the particles whose size distribution covers the broad range form the zinc oxide film, the number of the particles contained in the zinc oxide film becomes lower than that of particles in the case where only the particles having extremely small size form the zinc oxide film, and therefore the electron mobility in the zinc oxide film can be increased and a filling rate of the film can become a certain high level.

Actually, in the film forming material which has just applied on the conductive layer, dissolution and redeposition of zinc oxide occur to cause bonds (bindings) between the particles in the film forming material and bonds between the particles and the deposit (the deposit of zinc oxide by the electrodeposition) on the conductive layer. In the applying part 4, since the film forming material in the material tank 42 is agitated, aggregation of the particles can be prevented. And therefore it is prevented that uniformity of thickness of the film forming material applied on the conductive layer is degraded, blockage of the nozzle occur and so on. Also, as the material tank 42 having the agitating mechanism is provided in the vicinity of the slit nozzle 41, film forming material where dispersibility of the particles is low can be used. A component adjusting part for adjusting an amount of each component of the film forming material may be provided in the material tank 42.

Subsequently, in the auxiliary liquid supplying part 5, the auxiliary liquid which is almost saturated with zinc ion is supplied to the film forming material (i.e., the zinc oxide film) on the conductive layer (Step S14), dissolution and redeposition of zinc oxide are expedited in the zinc oxide film in the auxiliary liquid. Therefore, connecting portions between the particles in the zinc oxide film and connecting portions between the particles and the deposit on the conductive layer, become thick (i.e., contact areas between them increase) by deposition of zinc oxide, the bonds between the particles in the zinc oxide film and the bonds between the particles and the deposit on the conductive layer are further strengthened, and the electron mobility at the inside of the zinc oxide film and between the conductive layer and the zinc oxide film is increased. In FIG. 1, the auxiliary liquid ejected from the auxiliary liquid supplying part 5 is denoted by a reference sign 51. The deposition of zinc oxide between the particles in the zinc oxide film can be regarded as reduction of boundaries of crystals.

Actually, vapor of pure water (it may be large droplets) is spouted toward the conductive layer of the resin substrate 9 in the subsequent humidifying part 6 to prevent the conductive layer from drying, and therefore deposition of zinc oxide in the auxiliary liquid occurs continuously for long time (Step S15). The dissolution and deposition of zinc oxide in the zinc oxide film in the auxiliary liquid can be regarded as a part of formation of the zinc oxide film.

Then, when the resin substrate 9 comes to the second cleaning part 32, in a similar fashion to the first cleaning part 31, cleaning liquid such as pure water is gently spouted from a cleaning spray group 321 toward the surface of the resin substrate 9 on the belt 111 and subsequently, the cleaning liquid on the surface of the resin substrate 9 is removed by air blown from air knives 322. The resin substrate 9 passes through a dry kiln 323 whose inside is heated for example at approximately 100° C. and therefore drying of the resin substrate 9 is performed (Step S16). As above, since water, undesired substances derived from the electrodeposition liquid of the deposition part 2 and so on are removed from the resin substrate 9 where the zinc oxide film is formed, deterioration in quality and degradation of the dye-sensitized solar cell and so on due to existence of water and the undesired substances are prevented.

Figure 5:
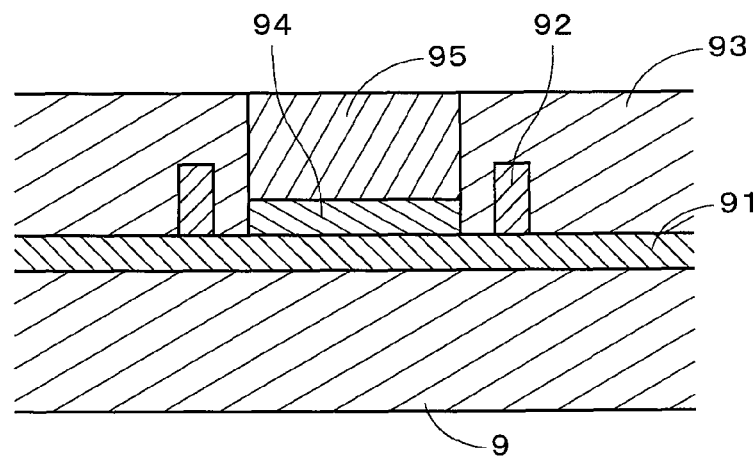
FIG. 5 is a cross-section view of the resin substrate.

The resin substrate 9 which has passed through the dry kiln 323 is brought out from the belt 111 by a robot arm which is not shown. In the resin substrate 9, as shown in FIG. 5, the deposit 94 is formed on the conductive layer 91 and the zinc oxide film 95 is formed on the deposit 94. In the downstream processes, after the mask 93 covering the wiring pattern 92 on the conductive layer 91 is removed, sensitizing dye is adsorbed (supported) on the porous zinc oxide film 95. Then, a counter substrate having a counter electrode is provided so that the counter substrate faces the resin substrate 9, electrolyte which is in liquid (or in pseudo-liquid) is injected between two substrate (between the photoelectric conversion layer and the counter electrode) to form a charge transport layer, and therefore the dye-sensitized solar cell is manufactured.

As discussed above, in the zinc oxide film forming apparatus 1 of FIG. 1, the deposit containing zinc oxide is formed on the conductive layer of the resin substrate 9 by electrodeposition in the deposition part 2, and subsequently the resin substrate 9 is carried to the applying part 4. The film forming material which is in liquid or paste form and contains particles of zinc oxide and solvent, is applied onto the conductive layer, and then the solvent is removed from the film forming material on the conductive layer by volatilization, so that the porous zinc oxide film is formed on the conductive layer.

Here, in the case where a zinc oxide film containing the template agent is formed on the conductive layer of the substrate by only electrodeposition using the electrodeposition liquid containing the template agent and then the template agent is desorbed to form the porous zinc oxide film, for example 0.5 to 2 hours are required for the electrodeposition and 1 to 24 hours are required for the desorption of the template agent. In the case where a zinc oxide film is formed by only application of the film forming material containing the particles of zinc oxide and the solvent, since adhesion between the zinc oxide film and the conductive layer is not secured, there is a case where the zinc oxide film falls off from the resin substrate 9.

Correspondingly, in the zinc oxide film forming apparatus 1, the formation of the deposit in the deposition part 2 can be finished in about 30 seconds in a certain condition as described later and the application of the film forming material in the applying part 4 can be finished in about 1 minute. And also, by the bond between the conductive layer and the deposit in the electrodeposition and the bond between the deposit and the zinc oxide film in the application of the film forming material, adhesion between the zinc oxide film formed on the deposit and the conductive layer can be increased. As above, in the zinc oxide film forming apparatus 1, it is achieved to easily and efficiently (i.e., in a short time period) form the porous zinc oxide film, which has superior adhesion to the conductive layer of the resin substrate 9, on the conductive layer and the productivity of the dye-sensitized solar cell can be increased.

In the auxiliary liquid supplying part 5, since the auxiliary liquid which is almost saturated with zinc ion is supplied to the film forming material on the conductive layer after the application of the film forming material, it is possible to further strengthen the bonds (bonding forces) between the particles of zinc oxide and the bonds between the particles and the deposit, and adhesion (adhesion force) between the zinc oxide film and the conductive layer can be further increased.

Furthermore, in the zinc oxide film forming apparatus 1, since the wiring pattern on the conductive layer of the resin substrate 9 is covered with the mask, the electrodeposition can be performed appropriately. Also, the mask having repellency to the film forming material suppresses that the film forming material adheres to the mask, and it is therefore possible to remove the mask easily.

Figure 6:
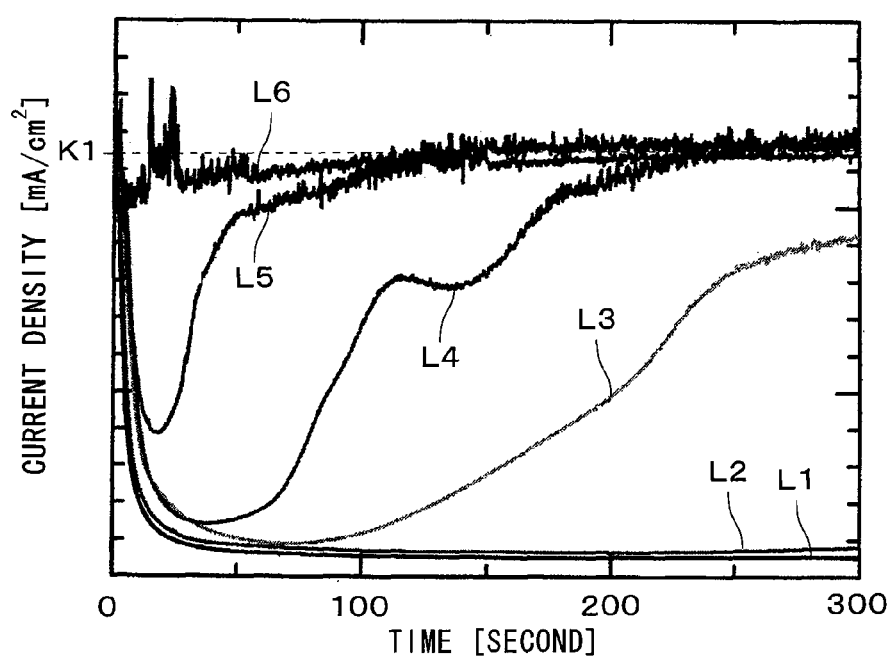
FIG. 6 is a view showing changes of current density in a conductive layer of the resin substrate.

Here, discussion will be made on the relationship between current density in the resin substrate 9 and the temperature of the electrodeposition liquid in the electrodeposition. FIG. 6 is a view showing changes of current density in the conductive layer of the resin substrate 9. In FIG. 6, changes of current density in the cases where the temperatures of the electrodeposition liquid are 30, 35, 40, 45, 50, 60° C. are shown by lines denoted by reference signs L1, L2, L3, L4, L5, L6, respectively. Here, the current density is a value obtained by dividing the electric current in the conductive layer which is obtained in the power source part 24, by an area of the conductive layer (except the area of the mask) (the value is an average current density).

As shown in FIG. 6, except the case where the temperature of the electrodeposition liquid is 60° C. (the line L6), each current density decreases with time immediately after the supply of the voltage (the difference of the electrical potentials) between the conductive layer of the resin substrate 9 and the reference electrode 23 is started (in the vicinity of 0 second in FIG. 6). After that, it increases to remain at an almost constant value K1. In FIG. 6, although the current densities in the case where the temperatures of the electrodeposition liquid are 30, 35, 40° C. (the current densities shown by the lines L1 to L3) do not increase up to the value K1 for 300 seconds from the start of supply of the voltage, actually they reach the value K1 at times after 300 seconds.

Here, it is considered that decrease of the current density immediately after the start of supply of the voltage corresponds to formation stage of initial nucleuses of crystals of zinc oxide on the conductive layer and initial stage of nucleation of crystals, subsequently the nucleation of crystals is activated, and the current density increases with increase of those surface areas. Then, zinc oxide on the conductive layer comes to a film (thin film). When the surface area becomes almost constant, the current density remains at the constant value K1 (it becomes almost same as the current density in the case where the temperature of the electrodeposition liquid is 60° C.). Thus, in the case where the temperature of the electrodeposition liquid is relatively low (equal to or lower than 50° C.), when the supply of the voltage is stopped at a time within a period from immediately after the start of supply of the voltage between the conductive layer of the resin substrate 9 and the reference electrode 23 (preferably, after the current density changes from decreasing to increasing) to immediately before the current density becomes the value K1, the deposit of zinc oxide is formed in the form of numerous islands on the conductive layer of the resin substrate 9, and when the supply of the voltage is stopped at a time within a period where the current density remains at the value K1, the deposit of zinc oxide is formed in the form of a film on the conductive layer of the resin substrate 9.

On the other hand, in the case where the temperature of the electrodeposition liquid is 60° C. (see the line L6), the current density fluctuates widely for about 60 seconds from immediately after the start of supply of the voltage between the conductive layer of the resin substrate 9 and the reference electrode 23. Although the decrease of the current density as seen in the case where the temperature of the electrodeposition liquid is equal to or lower than 50° C. is hardly observed, it is considered that the deposit of zinc oxide is formed in the form of numerous islands on the conductive layer of the resin substrate 9 in this period. After about 60 seconds from the start of supply of the voltage, the current density stabilizes at the almost constant value K1. In the case where the temperature of the electrodeposition liquid is 60° C., it is considered that the deposit of zinc oxide becomes a film on the conductive layer of the resin substrate 9 immediately after about 60 seconds from the start of supply of the voltage.

By making the temperature of the electrodeposition liquid higher than 60° C., a time period from the start of supply of the voltage to the time when the deposit of zinc oxide on the conductive layer becomes a film can be further reduced. However, actually there is a certain limit of reduction of the time period due to decrease of oxygen concentration of the electrodeposition liquid in the vicinity of the conductive layer of the resin substrate 9. Furthermore, a softening point of the resin substrate 9 is relatively low and the electrodeposition liquid is water solution in the present embodiment. Because of these reasons and so on, it is preferred that the temperature of the electrodeposition liquid is made to be equal to or lower than 70° C. In the case where the temperature of the electrodeposition liquid is 70° C., the deposit almost in the form of a film is obtained in about 30 seconds from the start of supply of the voltage. Also, a time period to make the deposit become a film can be reduced by increasing flow rate of the electrodeposition liquid spouted from the supply pipe 271 toward the resin substrate 9 or increasing the rotation speed of the substrate holding part 25 by the rotating mechanism 26.

Figure 7:
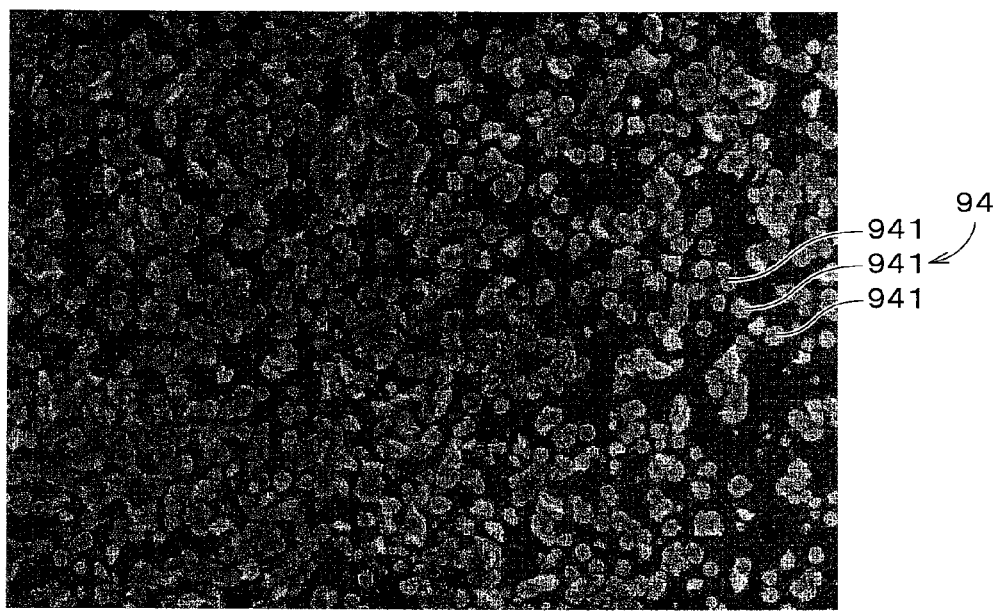
FIG. 7 is a view showing an example of a deposit.

As described above, in the deposition part 2 of the zinc oxide film forming apparatus 1, the state of the deposit differs in accordance with the process time of the electrodeposition. Thus, for improving the productivity of the dye-sensitized solar cell by performing formation of the deposit in short time period, it is preferred that the deposit of zinc oxide is formed in the form of numerous islands on the conductive layer. In FIG. 7, the deposit 94 formed in the form of numerous islands 941 is shown. For further improving adhesion between the zinc oxide film and the conductive layer, it is preferred that the deposit of zinc oxide is formed in the form of a film (it may be a state where numerous islands is bonded (i.e., the film includes numerous pits)) on the conductive layer to increase a contact area between the deposit and the zinc oxide film formed by supplying the film forming material and a contact area between the deposit and the conductive layer on the resin substrate 9 (the same applies to the zinc oxide film forming apparatus 1a, 1b discussed later). In the case where the deposit of zinc oxide is formed in the form of a film on the conductive layer, electric resistance between the conductive layer and the zinc oxide film becomes lower than that in the case of formation of the deposit in the form of numerous islands, and therefore performance of the dye-sensitized solar cell can be improved.

Figure 8A:
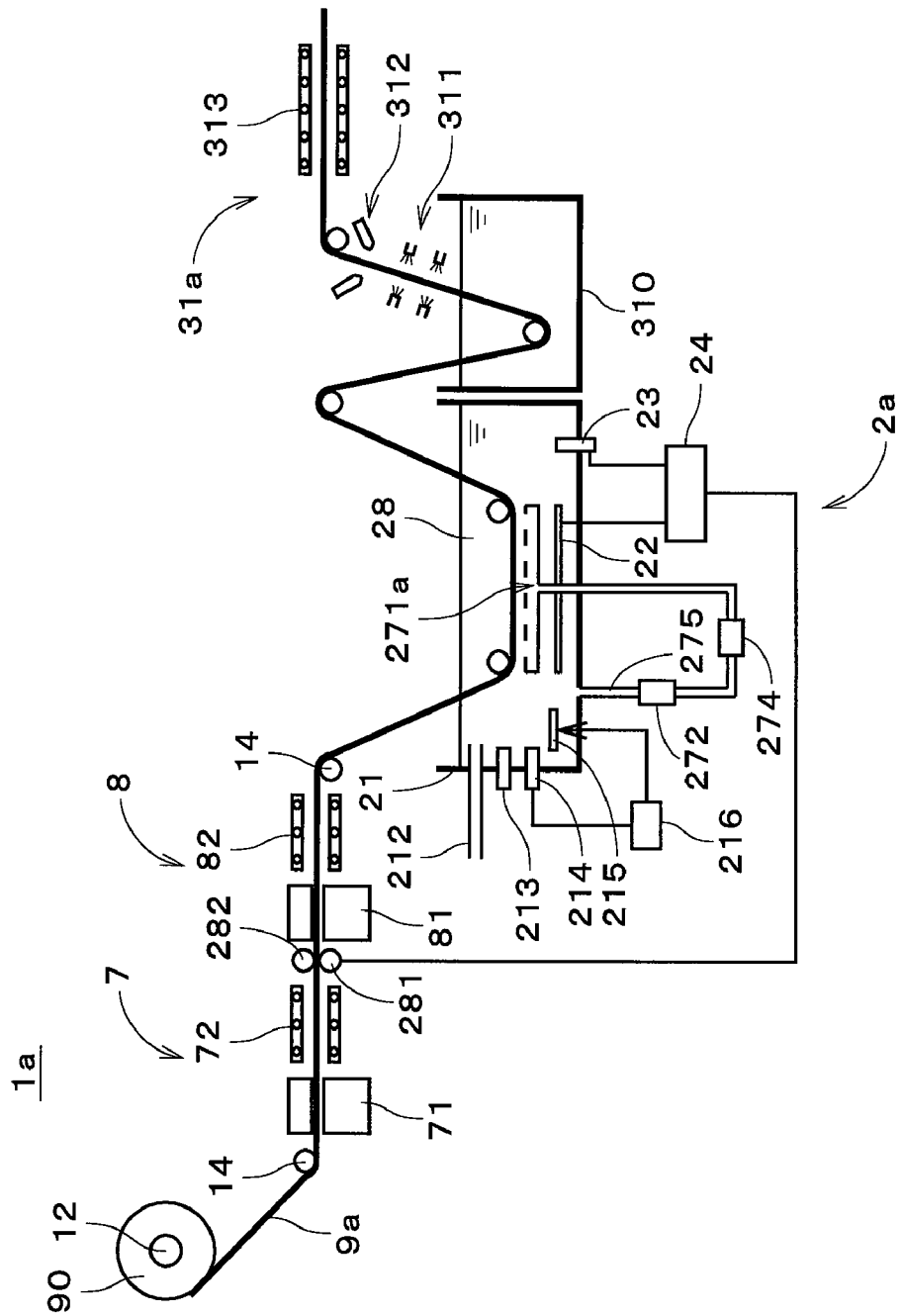
FIGS. 8A and 8B are views showing a constitution of a zinc oxide film forming apparatus in accordance with a second preferred embodiment.
Figure 8B:
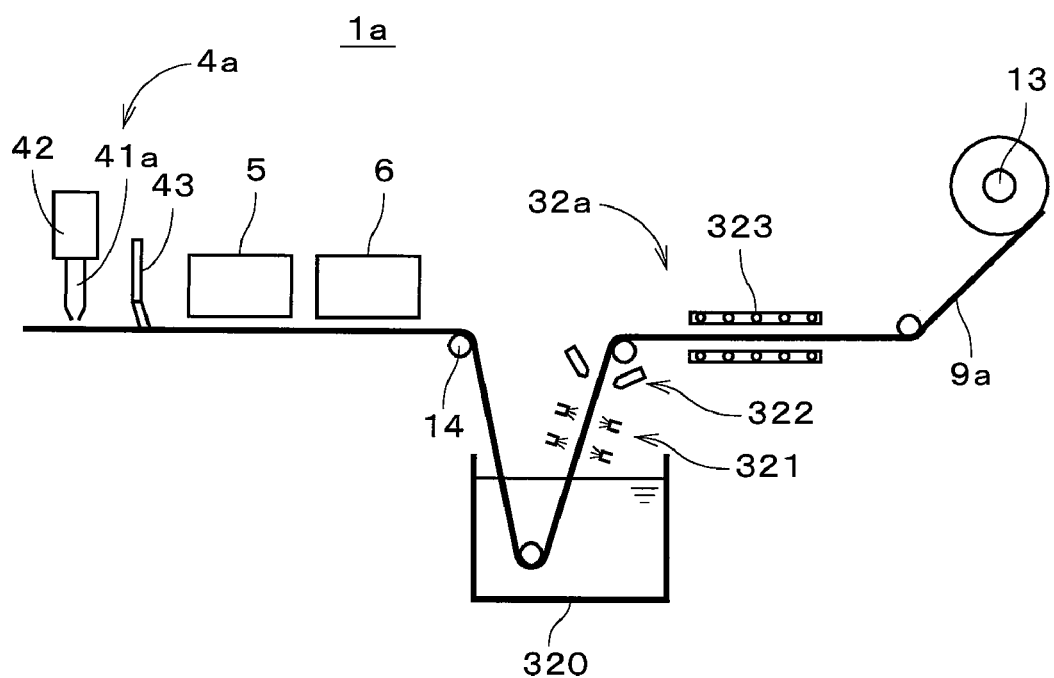

FIGS. 8A and 8B are views showing a constitution of a zinc oxide film forming apparatus 1a in accordance with a second preferred embodiment of the present invention. In the zinc oxide film forming apparatus 1a, a porous zinc oxide film is formed on a transparent resin film (plastic film) 9a on which a transparent conductive layer is formed.

As shown in FIGS. 8A and 8B, the zinc oxide film forming apparatus 1a comprises a drawing part 12 for continuously drawing (withdrawing) respective portions of the resin film 9a which is a base member of a continuous sheet (i.e., portions continuously existing on the belt-like resin film) from a roll 90 (it is also called as web) of the resin film, a wiring pattern forming part 7 for forming a predetermined wiring pattern on the conductive layer (of the respective portions) of the resin film 9a, a mask forming part 8 for forming a mask covering the wiring pattern on the conductive layer, a deposition part 2a for forming a deposit of zinc oxide on the conductive layer by electrodeposition, a first cleaning part 31a for cleaning and drying the resin film 9a on which the deposit is formed, an applying part 4a for applying film forming material which is in liquid or paste form and contains particles of zinc oxide, onto the conductive layer, an auxiliary liquid supplying part 5 for supplying auxiliary liquid, which is almost saturated with zinc ion, to the film forming material on the conductive layer after application of the film forming material by the applying part 4a, a humidifying part 6 for spouting vapor of pure water toward the conductive layer of the resin film 9a to which the auxiliary liquid is supplied, a second cleaning part 32a for cleaning and drying the resin film 9a, and a winding part 13 for winding the resin film 9a.

In the zinc oxide film forming apparatus 1a, the drawing part 12, the wiring pattern forming part 7, the mask forming part 8, the deposition part 2a, the first cleaning part 31a, the applying part 4a, the auxiliary liquid supplying part 5, the humidifying part 6, the second cleaning part 32a and the winding part 13 are arranged in one line with respect to a predetermined direction, and a plurality of rollers 14 each extending in a horizontal direction perpendicular to the predetermined direction are disposed over the entire length of the zinc oxide film forming apparatus 1a, to continuously carry the respective portions of the resin film 9a drawn from the drawing part 12 to the winding part 13 at a slow speed. As above, the plurality of rollers 14 are a moving mechanism for sequentially moving the plurality of portions which are continuous in a longitudinal direction of the resin film 9a, to the wiring pattern forming part 7, the mask forming part 8, the deposition part 2a, the first cleaning part 31a, the applying part 4a, the auxiliary liquid supplying part 5, the humidifying part 6 and the second cleaning part 32a. The rollers 14 are made of material having corrosion resistance relative to liquid (after-mentioned electrodeposition liquid and the rest) used in the zinc oxide film forming apparatus 1a.

The wiring pattern forming part 7 comprises a printing part 71 for forming a pattern of silver paste on the conductive layer of the resin film 9a by the printing method and a dry kiln 72 for drying the silver paste on the conductive layer, and the wiring pattern is formed on the conductive layer with the material (the material contains silver) whose specific resistance is lower than that of the conductive layer by the wiring pattern forming part 7. The mask forming part 8 comprises a printing part 81 for supplying a predetermined mask material onto the wiring pattern of the resin film 9a by the printing method and a dry kiln 82 for drying the mask material on the conductive layer, and the mask having repellency to the film forming material is formed by the mask forming part 8 so that the wiring pattern is covered with the mask.

The printing parts 71, 81 each has a rotating drum to continually form the pattern on the continuous portions of the resin film 9a. Each printing part 71, 81 may form the pattern by another printing method. For example, in the case where the screen printing method is employed, printing operation is performed in the state where the resin film 9a is stopped. After completion of the printing operation, the resin film 9a is moved by a length (the length in a moving direction of the resin film 9a) of an area on which a pattern is formed by one printing operation, and then next printing operation is performed In the case where the resin film 9a is made of resin, whose softening point is relatively high, such as polyethylene naphthalate (PEN), the resin film 9a can be heated at a high temperature in the dry kiln 72 and it is therefore possible to further decrease electric resistance of the wiring pattern which is dried silver paste.

The deposition part 2a comprises an electrodeposition bath 21 which stores electrodeposition liquid containing zinc chloride and template agent, a counter electrode 22 and a reference electrode 23 immersed in the electrodeposition liquid, and a power source part 24 which is electrically connected with each of the counter electrode 22 and the reference electrode 23 in a similar fashion to the deposition part 2 of FIG. 2. Two contact rollers 281, 282 which contact with the both main surfaces, respectively, are provided between the wiring pattern forming part 7 and the mask forming part 8 so as to sandwich the resin film 9a. In the deposition part 2a, the bottom contact roller 281 is a contact part which contacts with the wiring pattern formed in the wiring pattern forming part 7, the contact roller 281 having electrical conductivity is connected with the power source part 24, and therefore the conductive layer of the resin film 9a is electrically connected with the power source part 24 through the wiring pattern on the conductive layer and the contact roller 281.

An oxygen inlet pipe 212 for supplying oxygen into the electrodeposition liquid (performing so-called oxygen bubbling), a dissolved oxygen meter 213 for measuring oxygen concentration in the electrodeposition liquid, and a thermometer 214 for measuring a temperature of the electrodeposition liquid are attached to the electrodeposition bath 21. A heater 215 is provided in the electrodeposition liquid, a temperature controller 216 controls the heater 215 on the basis of output of the thermometer 214, and therefore the electrodeposition liquid remains at a constant temperature. In the deposition part 2a, other kinds of electrodeposition liquid containing zinc ion, such as electrodeposition liquid containing zinc nitrate ($Zn(NO_3)_2$) and the template agent, can be used (the same applies to the deposition part 2 of FIG. 2).

A spouting part 271a is provided in the electrodeposition bath 21 so as to face the resin film 9a in the electrodeposition liquid, and the spouting part 271a have a plurality of outlets which spout the electrodeposition liquid toward the conductive layer of the resin film 9a. An exhaust pipe 275 is provided to the electrodeposition bath 21, and the electrodeposition liquid exhausted from the exhaust pipe 275 is sent to the spouting part 271a through a filter 274 by a pump 272.

Next, discussion will be made on a process of forming the zinc oxide film on the resin film 9a in the zinc oxide film forming apparatus 1a with reference to FIG. 3. In the zinc oxide film forming apparatus 1a, respective operations in FIG. 3 which are surrounded by rectangles of dashed lines (i.e., operations of Steps S10a, S10b, S16a) are also performed.

In the zinc oxide film forming apparatus 1a shown in FIG. 8A, parts of the plurality of rollers 14 which are connected with a motor(s) start to rotate in same direction, and therefore the respective portions of the resin film 9a which are an object to be processed, are sequentially drawn from the roll 90 in the drawing part 12. Hereinafter, the downstream processes are discussed with focus on a portion of the resin film 9a drawn in the drawing part 12, and the portion is referred to as "target portion". In fact, all processes in the zinc oxide film forming apparatus 1a are performed in parallel relatively to corresponding portions of the resin film 9a, respectively.

The target portion drawn from the roll 90 is moved to a position where the target portion faces the printing part 71 of the wiring pattern forming part 7 and the pattern of the silver paste is formed on the conductive layer of the target portion. Then, the target portion passes through the dry kiln 72 and therefore the silver paste is hardened (dried) to form the wiring pattern on the conductive layer (Step S10a). Subsequently, at a position where the target portion faces the printing part 81 of the mask forming part 8, the mask material having insulating property is supplied onto the wiring pattern of the target portion. Then, the target portion passes through the dry kiln 82 and therefore the mask material is hardened to form the mask covering the wiring pattern (Step S10b).

The target portion on which the mask is formed is moved into electrodeposition bath 21 to be immersed in the electrodeposition liquid. As described above, the power source part 24 is electrically connected with the conductive layer of the resin film 9a through the contact roller 281 and the wiring pattern on the conductive layer, a predetermined voltage is supplied between the reference electrode 23 in the electrodeposition liquid and the conductive layer of the resin film 9a, and therefore the deposit is formed on the conductive layer in the electrodeposition liquid by the electrodeposition (Step S11).

The target portion on which the deposit is formed is brought out from the electrodeposition bath 21, and then the target portion is continuously moved to a cleaning bath 310 of the first cleaning part 31a. A predetermined cleaning liquid is stored in the cleaning bath 310 and the target portion is immersed in the cleaning liquid. After that, pure water is spouted from a cleaning spray group 311 toward the surface of the target portion, and pure water (and the cleaning liquid) on the surface of the target portion is removed by air blown from air knives 312. At this time, since a certain amount of the template agent in the deposit is removed, the deposit on the conductive layer becomes porous. The cleaned target portion passes through a dry kiln 313 and therefore drying of the target portion is performed (Step S12)

Subsequently, when the target portion comes under the applying part 4a shown in FIG. 8B, the film forming material (i.e., the film forming material containing particles of zinc oxide) supplied from the material tank 42 having an agitating mechanism is ejected from an application nozzle 41a. A squeegee 43 (it is also called as drawing paddle) which contacts with the mask on the resin film 9a is provided behind the application nozzle 41a (i.e., downstream in the moving direction of the target portion), and the film forming material supplied by the application nozzle 41a is drawn out by the squeegee 43 so that a thickness of the film forming material becomes same as that of the mask. In this way, the film forming material is applied on the conductive layer where the deposit is formed, in the applying part 4a (Step S13).

Actually, before the target portion reaches the subsequent auxiliary liquid supplying part 5, a certain amount of the solvent in the film forming material on the conductive layer is removed by volatilization, so that a porous zinc oxide film is formed on the conductive layer. If a width of the resin film 9a is wide, it is preferred that a plurality of application nozzles 41a are arranged in a width direction so that the film forming material ejected on the conductive layer spreads in the width direction in a short time period. Application of the film forming material onto the resin film 9a may be performed by a brush and so on, as substitute for the application nozzle 41a.

After the application of the film forming material, the auxiliary liquid which is almost saturated with zinc ion is supplied to the film forming material (or the zinc oxide film) on the conductive layer in the auxiliary liquid supplying part 5, and subsequently vapor of pure water is spouted toward the conductive layer of the target portion in the humidifying part 6 (Step S14, S15). Therefore, the bonds between the particles in the zinc oxide film and the bonds between the particles and the deposit on the conductive layer are further strengthened.

The target portion which has passed through the humidifying part 6 is continuously moved into a cleaning bath 320 of the second cleaning part 32a. Stripping liquid (commercially available stripper, acetone or the like) to strip the mask on the conductive layer is stored in the cleaning bath 320 and the target portion is immersed in the stripping liquid to remove the mask on the conductive layer (Step S16a). Subsequently, pure water is spouted from a cleaning spray group 321 toward the surface of the target portion, and pure water (and the stripping liquid) on the surface of the target portion is removed by air blown from air knives 322. The target portion passes through a dry kiln 323 and therefore drying of the target portion is performed (Step S16). After that, the target portion is wound by the winding part 13 and the process of formation of the zinc oxide film for the target portion of the resin film 9a is completed.

As discussed above, in the zinc oxide film forming apparatus 1a of FIGS. 8A and 8B, the wiring pattern and the mask covering the wiring pattern are formed on the conductive layer of the resin film 9a, and the deposit containing zinc oxide is formed on the conductive layer by the electrodeposition. Subsequently, the film forming material which is in liquid or paste form and contains particles of zinc oxide and solvent, is applied onto the conductive layer, the solvent is removed from the film forming material on the conductive layer, and it is therefore achieved to easily and efficiently form the porous zinc oxide film which has superior adhesion to the conductive layer of the resin film 9a.

Also, in the zinc oxide film forming apparatus 1a, provided is the contact roller 281 which contacts with the wiring pattern on the conductive layer at the upstream of the mask forming part 8 with respect to the moving direction of the plurality of portions of the resin film 9a, and it is therefore achieved to easily supply the voltage to the conductive layer in the electrodeposition.

FIG. 9 is a view showing another example of the zinc oxide film forming apparatus and it shows a part of the zinc oxide film forming apparatus 1b. In the zinc oxide film forming apparatus 1b of FIG. 9, a third cleaning part 33 for cleaning the resin film 9a and a metal adding part 34 for adding (doping) predetermined metal such as gallium or indium (the metal is hereinafter referred to as "additive metal") to the zinc oxide film are added between the humidifying part 6 and the second cleaning part 32a of the zinc oxide film forming apparatus 1a of FIG. 8B. Constituent elements other than those are identical to those of the zinc oxide film forming apparatus 1a and the same elements are denoted by the same reference signs.

Figure 10:
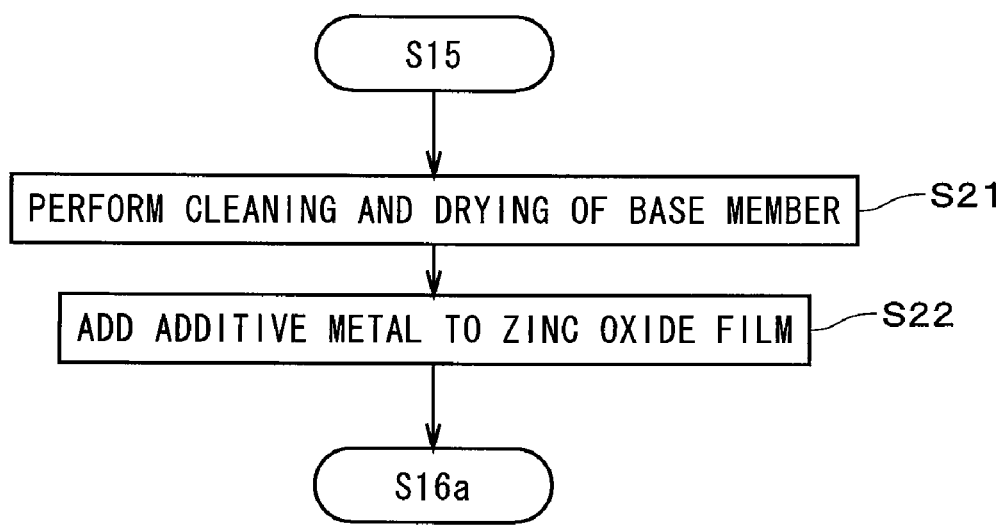
FIG. 10 is a flowchart showing a part of operation flow for forming the zinc oxide film on the base member.

FIG. 10 is a flowchart showing a part of operation flow for forming the zinc oxide film on the resin film 9a in the zinc oxide film forming apparatus 1b of FIG. 9 and it shows operations performed between Step S15 and Step S16a in FIG. 3. In the zinc oxide film forming apparatus 1b, after the supply of the auxiliary liquid and the spout of vapor of pure water to the film forming material on the conductive layer are performed for the target portion (FIG. 3: Step S14, S15), the target portion is continuously moved to a cleaning bath 330 of the third cleaning part 33. Predetermined cleaning liquid is stored in the cleaning bath 330, and the target portion is immersed in the cleaning liquid. After that, pure water is spouted from a cleaning spray group 331 toward the surface of the target portion, and pure water (and the cleaning liquid) on the surface of the target portion is removed by air blown from air knives 332. Then, the cleaned target portion passes through a dry kiln 333 and therefore drying of the target portion is performed (FIG. 10: Step S21).

Subsequently, the target portion is moved into a process bath 341 of the metal adding part 34. In the process bath 341, solution containing ion of the additive metal which has a nobler standard electrode potential (i.e., smaller ionization tendency) than zinc is stored. The target portion is immersed in the solution, immersion plating (displacement plating) is performed and therefore the additive metal is added to the zinc oxide film (Step S22). In FIG. 9, the solution stored in the process bath 341 is denoted by a reference sign 342.

After that, the target portion is moved to the cleaning bath 320 of the second cleaning part 32a and the mask on the conductive layer is removed (FIG. 3: Step S16a). Then, the cleaning by the cleaning spray group 321, the removal of pure water by the air knives 322 and drying by the dry kiln 323 are performed (Step S16), and the process of formation of the zinc oxide film for the target portion of the resin film 9a is completed.

As discussed above, in the zinc oxide film forming apparatus 1b of FIG. 9, the zinc oxide film on the target portion is supplied with the solution containing ion of the additive metal which is nobler than zinc by immersing the target portion in the solution, to easily form the zinc oxide film in which metal other than zinc is added. Therefore, the band gap of the zinc oxide film can be changed in accordance with dye to be adsorbed and so on, and design freedom of the dye-sensitized solar cell having high conversion efficiency can be increased. The zinc oxide film forming apparatus 1 of FIG. 1 may be provided with the metal adding part 34.

Though the preferred embodiments of the present invention have been discussed above, the present invention is not limited to the above-discussed preferred embodiments, but allows various variations.

In the deposition part 2, 2a of the zinc oxide film forming apparatus 1, 1a, 1b, there may be a case where the electrodeposition is performed in electrodeposition liquid which does not contain the template agent and the deposit which is not porous is formed. Even in this case, adhesion between the zinc oxide film formed on the deposit and the conductive layer can be increased by a bond between the conductive layer and the deposit and a bond between the deposit and the zinc oxide film. In the case where a porous deposit is formed on the conductive layer, since the surface area of the photoelectric conversion layer (i.e., the zinc oxide film and the deposit) is increased, performance of the dye-sensitized solar cell can be improved.

In the deposition part, the deposit of zinc oxide may be formed on the conductive layer of the resin substrate 9 or the resin film 9a (hereinafter, referred to as a "base member") by chemical deposition (the electroless method) where (a target portion of) the base member is immersed in liquid which contains for example zinc nitrate as a primary component after performing a predetermined pretreatment on the base member. The pretreatment for the chemical deposition is intended to make the surface of the base member suitable for the chemical deposition, activation treatment of the surface of the conductive layer or just the cleaning treatment in a certain condition of the chemical deposition is exemplified. In the case where the activation treatment of the surface of the conductive layer is performed, activating agent containing silver ion may be used, like the technique in Japanese Patent Application Laid-Open No. 2000-8180 (Document 4), and the disclosure of which is herein incorporated by reference.

The deposition part 2 need not be a single substrate type which performs the electrodeposition for only one resin substrate 9, but it may be a batch type which performs the formation of the deposit for a plurality of resin substrates 9 in one operation.

The zinc oxide film forming apparatus 1 of FIG. 1 may be provided with the applying part 4a having the squeegee 43 and the zinc oxide film forming apparatus 1a of FIG. 8B may be provided with the applying part 4 having the slit nozzle 41. The applying part having numbers of inkjet nozzles arranged in a horizontal direction perpendicular to the moving direction of the base member may be used. In this applying part, it is possible to apply the film forming material on the base member accurately (i.e., to each desired position with a desired amount thereof). Furthermore, in the applying part, the film forming material can be applied on areas other than the mask on the conductive layer by the screen printing method or the like. In a certain design of the zinc oxide film forming apparatus, a bath storing the film forming material is provided, the base member is immersed (dipped) in the film forming material of the bath, and therefore application of the film forming material onto the conductive layer is performed.

In the above first and second preferred embodiments, highly volatile organic solvent is used in the film forming material, and the solvent in the film forming material on the conductive layer is removed by volatilization, so that the porous zinc oxide film is formed on the conductive layer. However, depending on a kind of solvent contained in the film forming material, the solvent in the film forming material may be removed by performing heating or the like after application of the film forming material onto the conductive layer.

In the meantime, in the film forming material where the solvent contains macromolecular organic matter, since it need be burned at a high temperature to remove the organic matter, it is difficult to use the film forming material like this in formation of the zinc oxide film for a base member made of resin. Correspondingly, in the case where the solvent of the film forming material is water, it is possible to lower the cost of production of the film forming material, to easily remove the solvent in the film forming material, and to prevent impurities from remaining in the film forming material (zinc oxide film). Also, the film forming material may contain precursor of zinc oxide such as zinc hydroxide ($Zn(OH)_2$), and the precursor like this becomes zinc oxide by drying the film forming material on the conductive layer.

There may be a case where the auxiliary liquid supplying part 5 is provided with a process bath storing the auxiliary liquid and the resin substrate 9 or the target portion of the resin film 9a is immersed in the auxiliary liquid to supply the auxiliary liquid to the film forming material on the conductive layer. In the case where agitating is performed appropriately in the material tank 42 of the applying part 4, 4a, the film forming material which is saturated with zinc ion can be used.

The auxiliary liquid need not be saturated with zinc ion. As long as the auxiliary liquid, such as solution dissolving zinc oxide, contains zinc ion, zinc oxide can be deposited between the particles (nanometer-sized particles whose surfaces have high reactivity) in the zinc oxide film and between the particles and the deposit by supply of the auxiliary liquid to the film forming material on the conductive layer. Actually, in the case where the auxiliary liquid contains water which is polar solvent, as a primary component, typically in the case where the auxiliary liquid is water, parts of the film forming material applied on the conductive layer are dissolved into the water, and therefore similar product to the case of using the above solution dissolving zinc oxide is obtained and the bonds between the particles in the zinc oxide film and the bonds between the particles and the deposit can be further strengthened.

The metal adding part 34 may supply the zinc oxide film with the solution containing ion of the additive metal which is nobler than zinc, by ejecting the solution toward the zinc oxide film on the conductive layer. Since the bath storing the solution is expensive, it is preferred that the solution is supplied onto the zinc oxide film on the conductive layer by ejection to lower the cost of manufacturing the zinc oxide film forming apparatus (the same applies to the auxiliary liquid supplying part 5). And also, in this case, a humidifying part (for example, it is same as the humidifying part 6 in FIG. 1) may be provided at the downstream of the metal adding part 34 with respect to the moving direction of the base member to prevent the conductive layer from drying.

The base member where the zinc oxide film is formed in the zinc oxide film forming apparatus 1, 1a, 1b may be made of various materials other than resin. However, in the base member made of metal, glass or the like, a porous film used as a photoelectric conversion layer can be formed under the environment of high temperature, and in this case, high adhesion strength is secured between the conductive layer on the base member and the photoelectric conversion layer. Thus, it is considered that the zinc oxide film forming apparatus 1, 1a, 1b is particularly suitable for the case where the zinc oxide film is formed on the base member made of resin for which it is difficult to perform a process under the environment of high temperature.

While the invention has been shown and described in detail, the foregoing description is in all aspects illustrative and not restrictive. It is therefore understood that numerous modifications and variations can be devised without departing from the scope of the invention.

This application claims priority benefit under 35 U.S.C. Section 119 of Japanese Patent Application No. 2008-329755 filed in the Japan Patent Office on Dec. 25, 2008, the entire disclosure of which is incorporated herein by reference.

REFERENCE SIGNS LIST 1, 1a, 1b zinc oxide film forming apparatus
2, 2a deposition part
4, 4a applying part
5 auxiliary liquid supplying part
8 mask forming part
9 resin substrate
9a resin film
14 roller
21 electrodeposition bath
22 counter electrode
23 reference electrode
24 power source part
28 electrodeposition liquid
34 metal adding part
51 auxiliary liquid
91 conductive layer
92 wiring pattern
93 mask
94 deposit
95 zinc oxide film
281 contact roller
342 solution
411 film forming material
S11, S13, S14, S22 step

The invention claimed is:

1. A zinc oxide film forming method of forming a porous zinc oxide film on a base member, said zinc oxide film being used as a photoelectric conversion layer in a dye-sensitized solar cell, comprising the steps of:
   a) forming a deposit on a conductive layer formed on a base member by electrodeposition or chemical deposition, said deposit containing zinc oxide; and
   b) applying film forming material which is in liquid or paste form and contains particles of zinc oxide and solvent, onto said conductive layer where said deposit is formed, and removing said solvent from film forming material on said conductive layer to form a porous zinc oxide film on said conductive layer.

2. The zinc oxide film forming method according to claim 1, wherein
   said step b) comprises the step of supplying auxiliary liquid to film forming material on said conductive layer after application of film forming material, said auxiliary liquid being pure water or containing zinc ion.

3. The zinc oxide film forming method according to claim 1, wherein
   said deposit is formed in the form of numerous islands in said step a).

4. The zinc oxide film forming method according to claim 1, wherein
   said deposit is formed in the form of a film in said step a).

5. The zinc oxide film forming method according to claim 4, wherein electrodeposition is performed while said base member is immersed in electrodeposition liquid containing zinc ion and template agent in said step a).

6. The zinc oxide film forming method according to claim 1, further comprising the step of adding metal to said zinc oxide film by supplying said zinc oxide film with solution containing ion of said metal which is nobler than zinc after said step b).

7. The zinc oxide film forming method according to claim 2, further comprising the step of adding metal to said zinc oxide film by supplying said zinc oxide film with solution containing ion of said metal which is nobler than zinc after said step b).

8. The zinc oxide film forming method according to claim 1, wherein said base member is made of resin.

9. The zinc oxide film forming method according to claim 1, wherein a wiring pattern made of material whose specific resistance is lower than that of said conductive layer is formed on said conductive layer, and a mask having repellency to film forming material is formed so that said wiring pattern is covered with said mask in said base member.

* * * * *